July 18, 1939.                    H. LUND                    2,166,311

WEEDLESS BAIT

Filed Aug. 23, 1937

INVENTOR.
HAROLD LUND
BY
ATTORNEY.

Patented July 18, 1939

2,166,311

UNITED STATES PATENT OFFICE 2,166,311

WEEDLESS BAIT

Harold Lund, Minneapolis, Minn.

Application August 23, 1937, Serial No. 160,358

6 Claims. (Cl. 43—35)

This invention relates to weedless artificial baits, and the primary object is to provide in a fishing lure of the kind commonly known as plugs or baits, a novel and effective means of protecting the hooks so that the bait may be drawn through the water without becoming entangled with weeds or other obstructions growing in the water.

Another and important object is to provide a bait of this kind wherein the hooks may be concealed and protected while the bait is being cast and manipulated in the water, but which includes means for releasing the hooks when a fish strikes or takes the bait in its mouth so that the hooks will swing outward in position to engage and hold the fish. Another object is to provide a bait of this kind wherein the hook disengaging means is so arranged that they will form no impediment toward the fish taking the bait in the natural manner. Still another object is to provide a bait wherein all projecting parts of the hooks, their mounting and their releasing means, are provided with weed guards so as to prevent any part of the bait from tangling with the weeds, etc.

These and still other more specific objects will become apparent in the course of the following specification, reference being had to the accompanying drawing, wherein.

In carrying out my invention I provide the main body portion or member shown generally at 5 made up of wood or other buoyant material, and having a generally elongated shape and with a substantially rounded cross section. The frontal end has the usual angularly and obliquely extended faces 6 so that when the bait is pulled through the water, by means of a line (not shown) attached to the eye 7, the bait will take an erratic bobbing and dipping course calculated to attract a game fish.

Figure 1:
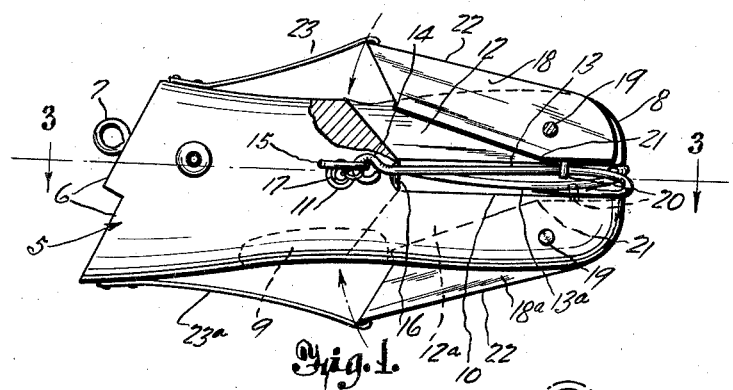
Fig. 1 is a side elevation of the bait, with a portion being broken away and shown in section, this view illustrating the hooks in their protected position.

The rear end 8 is rounded off, and the bait is weighted by a weight 9 secured in its intended underside so as to ride through the water erect as shown in Fig. 1.

A transversely and horizontally extended slot 10 is cut in the rear portion of the body member 5, and a short distance forwardly of the closed frontal end of the slot an aligned transverse and horizontal bore 11 is formed through the body. Also a vertically extended slot is cut through the rear portion at right angles to the aforesaid slot 10, and this slot thus forms upper and lower recesses 12—12a communicating at their inner sides with the slot 10.

Figure 2:
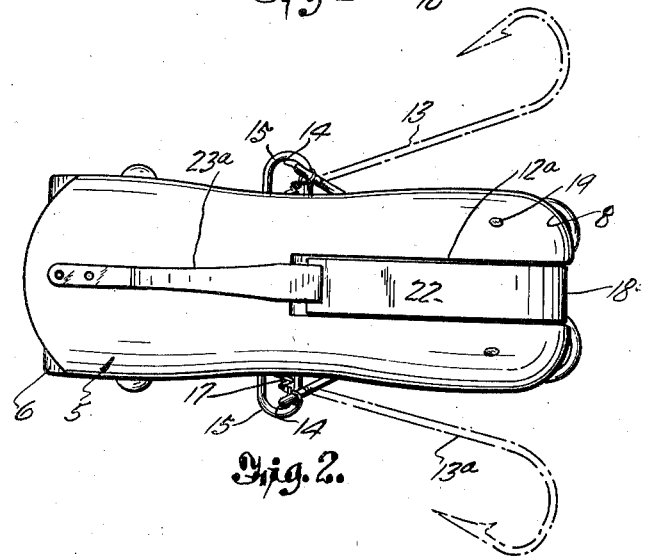
Fig. 2 is a bottom plan view of the bait, as shown in Fig. 1, the hooks being also shown in broken lines in their released position.
Figure 3:
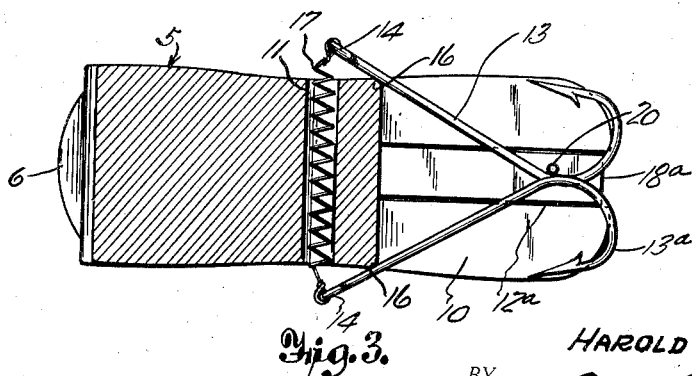
Fig. 3 is a longitudinal section along the line 3—3 in Fig. 1.

The hooks 13—13a have their eyes 14 slidably mounted in U-shaped staples 15 which are secured in the sides of the body member 5 over the ends of the bore 11, and these staples are set horizontally in such manner that the hooks 13—13a may be swung rearwardly and together at their free ends into the slot 10, as shown particularly in Fig. 3. In this position the points of the hooks, while turned outwardly, are nevertheless disposed within the slot 10 in such manner that they are protected thereby. As the hooks are swung inwardly to this described position they fulcrum on the corners 16 formed at the closed end of the slot 10, and as a result the eyed ends of the hooks swing outward away from the bore 11. These eyed ends of the hooks 13—13a are then joined by a retractile coil spring 17 which runs through the bore 11 between the hooks, and thus as the hooks are swung into the slot 10 this spring is put under a tension which is sufficient to swing the pointed ends of the hooks sharply outward (Fig. 2) when they are released from the slot.

To hold the hooks 13—13a in the slot 10 against this spring tension I provide release members or levers 18—18a which are disposed in the aforesaid recesses 12—12a, and are pivotally mounted adjacent their rear ends by transverse hinge pins 19. The adjacent or inner rear extremities of these levers 18—18a carry projecting studs or pins 20 which are adopted to engage inside of the rounded ends of the hooks 13—13a when the same are swung into the slot 10 (Fig. 3), and to prevent these hooks from swinging out of the slot under influence of the spring 17. These ends of the levers 18—18a are beveled off as shown at 21, and to bring the studs 20 into engagement with the hooks 13—13a the levers must be swung out from the recesses 12—12a at their frontal ends. In this position the outer faces 22 of the levers 18—18a incline or diverge forwardly and blend into the contour of the body member 5 at their rear ends. When the projecting frontal ends of the levers 18—18a are pressed back into the recesses 12—12a the studs 20 swing apart, freeing the hooks 13—13a and allowing them to fly outwardly from the slot 10 as shown.

Flat leaf guard springs 23—23a are secured at the frontal end of the body member 5, and the free ends of the springs extend rearwardly over the free ends of the levers 18—18a exerting a slight inward pressure thereon which, however, is not sufficient to move the levers. These springs 23—23a act as guards to fend off weeds or the like from entanglement with the projecting frontal ends of the levers 18—18a. The staples 15, aside from supporting the hooks 13—13a, also act as weed guards for the projecting eyed ends of the hooks, as will be readily apparent.

In use the hooks 13—13a are swung into the slot 10 and are then held therein by moving the free ends of the levers 18—18a outwardly as described. In this condition the bait is cast and manipulated through the water in usual manner, but as will be readily evident, the present very annoying trouble of tangling the bait in weeds or the like will be completely eliminated by my invention, since there are no projecting parts to become entangled. Then when the game fish strikes the bait or takes it in its mouth the levers 18—18a will be pushed back into the recesses 12—12a, freeing the hooks 13—13a and allowing them to swing outward and hook the fish. In this connection it might be stated herein that according to actual observation a fish, in taking a lure of this kind, opens its mouth just sufficiently to receive the bait endwise, and therefore the forwardly diverging relationship of the levers 18—18a in their opened position guides them into the mouth of the fish until they are finally closed and the hooks released.

It is understood that I may vary from the specific structure set out in the foregoing specification, so long as such variations do not depart from the spirit and the scope of the appended claims.

Having thus described my invention, what I claim as new and desire to protect by Letters Patent is:

1. In a bait, a body member having a slot, hooks adjustably mounted by their frontal ends on the body member and adapted to swing into the said slot, a spring connected to the frontal ends of the hooks and adapted to normally urge the hooks outward from the slot, pressure responsive members pivotally mounted adjacent their rear ends to the body member, and means on the rear ends of the members for engaging and releasably retaining the hooks in the slot when the frontal ends of the members are swung outwardly from the body member.

2. A bait comprising a body member having a slot and recesses extended into the slot at right angles, hooks pivotally and slidably mounted adjacent the closed end of the slot and adapted to swing at their free ends into the slot, the said hooks being adapted to fulcrum on the margins of the closed end of the slot when they are moved into the slot, whereby the pivoted ends of the hooks will move apart, a retractile coil spring stretched between these pivoted ends of the hooks, release members pivotally mounted at their rear ends in the said recesses, and means on the said members for engaging and releasably retaining the hooks in the slot.

3. A bait comprising a body member having a slot and recesses extended into the slot at right angles, hooks pivotally and slidably mounted adjacent the closed end of the slot and adapted to swing at their free ends into the slot, the said hooks being adapted to fulcrum on the margins of the closed end of the slot when they are moved into the slot, whereby the pivoted ends of the hooks will move apart, a retractile coil spring stretched between these pivoted ends of the hooks, release members pivotally mounted at their rear ends in the said recesses, and means on the said members for engaging and releasably retaining the hooks in the slot, the said members standing outward in the recesses and diverging in a forward direction when engaged with the said hooks.

4. A bait comprising a body member having a slot and recesses extended into the slot at right angles, hooks pivotally and slidably mounted adjacent the closed end of the slot and adapted to swing at their free ends into the slot, the said hooks being adapted to fulcrum on the margins of the closed end of the slot when they are moved into the slot, whereby the pivoted ends of the hooks will move apart, a retractile coil spring stretched between these pivoted ends of the hooks, release members pivotally mounted at their rear ends in the said recesses, and means on the said members for engaging and releasably retaining the hooks in the slot, the said members standing outward in the recesses and diverging in a forward direction when engaged with the said hooks, and leaf springs secured to the body member and engaged at their rear extremities with the diverging ends of the said members.

5. A bait comprising a body member having a slot, pivot means secured in the body member adjacent the slot, hooks pivotally mounted on the pivot means and adapted to swing into the slot, resilient means engaging the hooks to normally urge the same outwardly from the slot, and pressure responsive members connected to the body member for releasably holding the hooks in the said slot.

6. A weedless fishing bait and hook assembly comprising a body member having a recess, the said hook being pivotally mounted on the exterior of the body member for swinging movement at its pointed rear end into and out of the said recess, spring means effective to normally swing the hook outwardly from the recess, and a release member pivotally mounted by its rear end portion on the body member and normally extending outwardly therefrom at its frontal end portion, and the said release member having releasable connection with the hook for normally retaining the hook in position in the body recess but effective to free the hook in response to pressure exerted on the release member forwardly of its pivotal connection with the body member.

HAROLD LUND.